(12) United States Patent
Romero

(10) Patent No.: US 11,861,713 B2
(45) Date of Patent: Jan. 2, 2024

(54) VIRTUAL REALITY SYSTEM FOR ANALYZING FINANCIAL RISK

(71) Applicant: S&P Global Inc., New York, NY (US)

(72) Inventor: Cesar Romero, North Brunswick, NJ (US)

(73) Assignee: S&P Global Inc., New York, NY (US)

( * ) Notice: Subject to any disclaimer, the term of this patent is extended or adjusted under 35 U.S.C. 154(b) by 55 days.

(21) Appl. No.: 16/748,596

(22) Filed: Jan. 21, 2020

(65) Prior Publication Data
US 2021/0224910 A1 Jul. 22, 2021

(51) Int. Cl.
| | | |
|---|---|---|
| G06Q 40/06 | (2012.01) | |
| G06Q 10/0635 | (2023.01) | |
| G06F 3/16 | (2006.01) | |
| G06T 19/00 | (2011.01) | |
| G06N 5/04 | (2023.01) | |

(52) U.S. Cl.
CPC ............ *G06Q 40/06* (2013.01); *G06F 3/167* (2013.01); *G06N 5/04* (2013.01); *G06Q 10/0635* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 6,473,794 B1* | 10/2002 | Guheen | ............... | H04L 43/50 709/224 |
| 9,101,279 B2* | 8/2015 | Ritchey | ............ | A61B 5/6803 |
| 9,852,487 B1* | 12/2017 | Farnsworth | ............ | G06Q 50/16 |
| 10,410,289 B1* | 9/2019 | Tofte | .................. | G06T 7/00 |
| 10,489,861 B1* | 11/2019 | Ross | .................. | G06Q 40/08 |
| 2004/0027451 A1* | 2/2004 | Baker | ................. | H04N 5/2259 348/51 |
| 2005/0086158 A1* | 4/2005 | Clare | .................... | G06Q 30/02 705/38 |
| 2005/0128293 A1* | 6/2005 | Wilsey | ............... | G06K 7/10079 235/487 |
| 2009/0031246 A1* | 1/2009 | Cowtan | ................. | G06Q 30/00 715/854 |
| 2011/0261049 A1* | 10/2011 | Cardno | .................. | G06Q 40/04 345/419 |
| 2012/0136780 A1* | 5/2012 | El-Awady | ............ | G06Q 20/102 705/40 |
| 2014/0257862 A1* | 9/2014 | Billman | ................. | G06Q 40/08 705/4 |

(Continued)

*Primary Examiner* — William J Jacob
(74) *Attorney, Agent, or Firm* — Yee & Associates, P.C.

(57) ABSTRACT

A method, system, and computer program product for analyzing financial risk of a financial security. A video is displayed by the computer system on a mobile display system. Object detection is performed on the video to identify a fixed asset in the video. The computer system identifies a financial security supported by the fixed asset identified in the video. An overlay of financial data about the financial security is displayed in association with the fixed asset in the video. The financial data includes a financial model of the financial security and an assumption of the financial model. The assumption of the financial model is updated based on a status of the fixed asset in the video. The financial risk of the financial security is analyzed based on the financial model and the assumption that was updated.

23 Claims, 16 Drawing Sheets

(56) References Cited

U.S. PATENT DOCUMENTS

| | | | |
|---|---|---|---|
| 2015/0106738 A1* | 4/2015 | Black | G06F 3/04842 |
| | | | 715/748 |
| 2015/0162006 A1* | 6/2015 | Kummer | H04N 21/47217 |
| | | | 704/275 |
| 2015/0319509 A1* | 11/2015 | Huang | H04N 21/482 |
| | | | 725/53 |
| 2015/0319510 A1* | 11/2015 | Ould Dellahy, VIII | |
| | | | H04N 21/4725 |
| | | | 725/32 |
| 2017/0180712 A1* | 6/2017 | Ohashi | H04N 13/00 |
| 2017/0187993 A1* | 6/2017 | Martch | G08B 13/19684 |
| 2018/0218453 A1* | 8/2018 | Crabtree | G06N 5/022 |
| 2020/0111242 A1* | 4/2020 | Gupta | G06T 11/00 |

\* cited by examiner

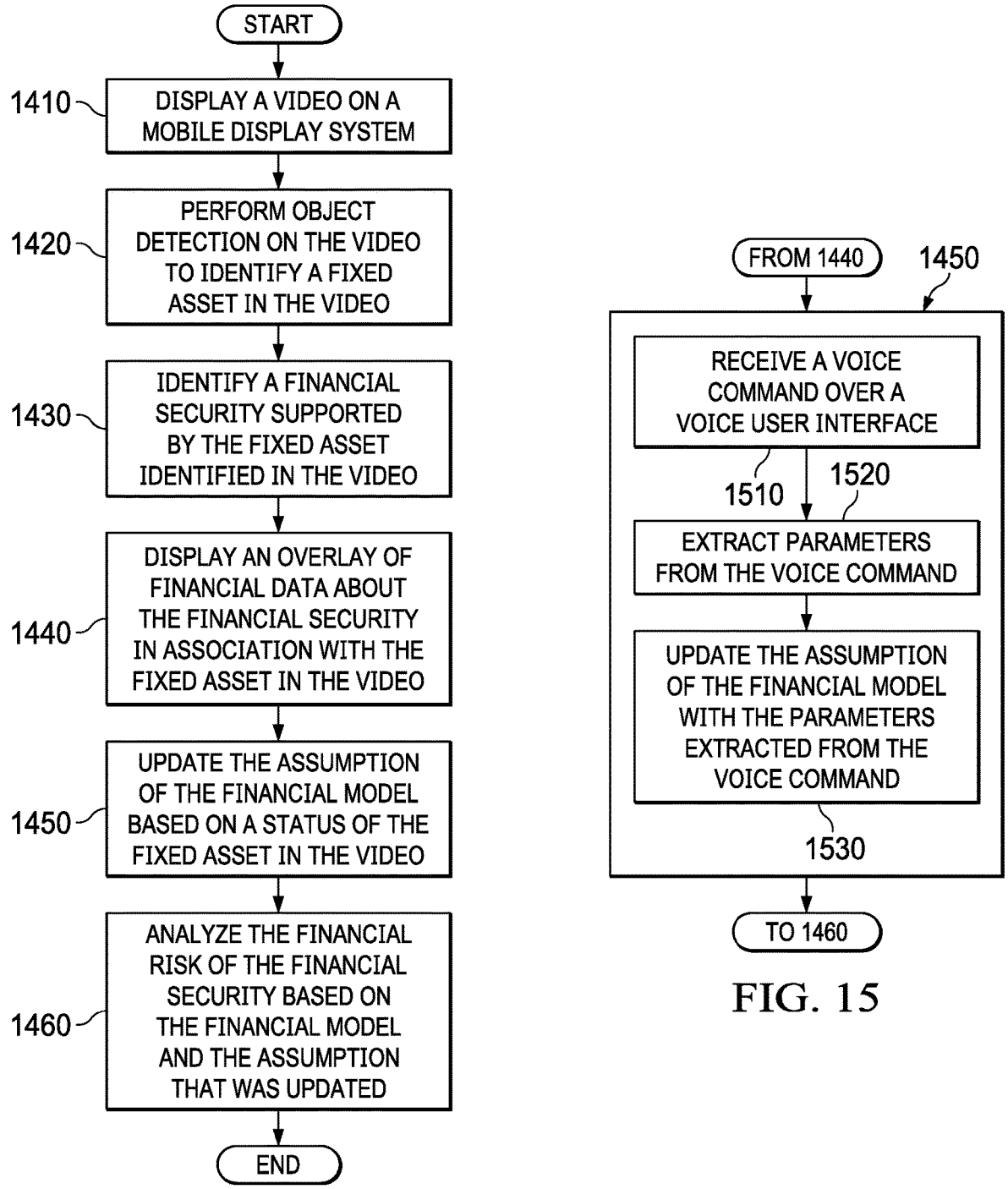

VIRTUAL REALITY SYSTEM FOR ANALYZING FINANCIAL RISK

BACKGROUND

1. Field

The disclosure relates generally to an improved computer system and, more specifically, to a method, apparatus, system, and computer program product for analyzing financial risk of a financial security.

2. Description of the Related Art

Virtual reality (VR) simulation systems provide users with the perception of being physically present in a virtual environment. The users may interact with the virtual environment using hardware that provides feedback to the users. Through such feedback, virtual reality simulation systems may be used to simulate different experiences. Although VR applications are being developed on a daily basis for various purposes, they primarily serve the areas of media and entertainment.

SUMMARY

According to one embodiment of the present invention, a computer-implemented method is provided for analyzing financial risk of a financial security. A video is displayed by a computer system on a mobile display system. Object detection is performed on the video by the computer system to identify a fixed asset in the video. The computer system identifies a financial security supported by the fixed asset identified in the video. An overlay of financial data about the financial security is displayed by the computer system in association with the fixed asset in the video. The financial data includes a financial model of the financial security and an assumption of the financial model. The assumption of the financial model is updated by the computer system based on a status of the fixed asset in the video. The financial risk of the financial security is analyzed by the computer system based on the financial model and the assumption that was updated.

According to another embodiment of the present invention, a risk visualization system comprises a computer system that displays a video on a mobile display system. The computer system performs object detection on the video to identify a fixed asset in the video. The computer system identifies a financial security supported by the fixed asset identified in the video. The computer system displays an overlay of financial data about the financial security in association with the fixed asset in the video. The financial data includes a financial model of the financial security and an assumption of the financial model. The computer system updates the assumption of the financial model based on a status of the fixed asset in the video. The computer system analyzes the financial risk of the financial security based on the financial model and the assumption that was updated.

According to yet another embodiment of the present invention, a computer program product for analyzing financial risk of a financial security comprises a computer-readable-storage media with program code stored on the computer-readable storage media. The program code includes code for displaying a video on a mobile display system. The program code includes code for performing object detection on the video to identify a fixed asset in the video. The program code includes code for identifying a financial security supported by the fixed asset identified in the video. The program code includes code for displaying an overlay of financial data about the financial security in association with the fixed asset in the video. The financial data includes a financial model of the financial security and an assumption of the financial model. The program code includes code for updating the assumption of the financial model based on a status of the fixed asset in the video. The program code includes code for analyzing the financial risk of the financial security based on the financial model and the assumption that was updated

BRIEF DESCRIPTION OF THE DRAWINGS

FIG. 14 is a flowchart of a process for analyzing financial risk of a financial security in accordance with an illustrative embodiment;

FIG. 15 is a flowchart of a process for updating the assumption of the financial model in accordance with an illustrative embodiment;

DETAILED DESCRIPTION

Figure 1:
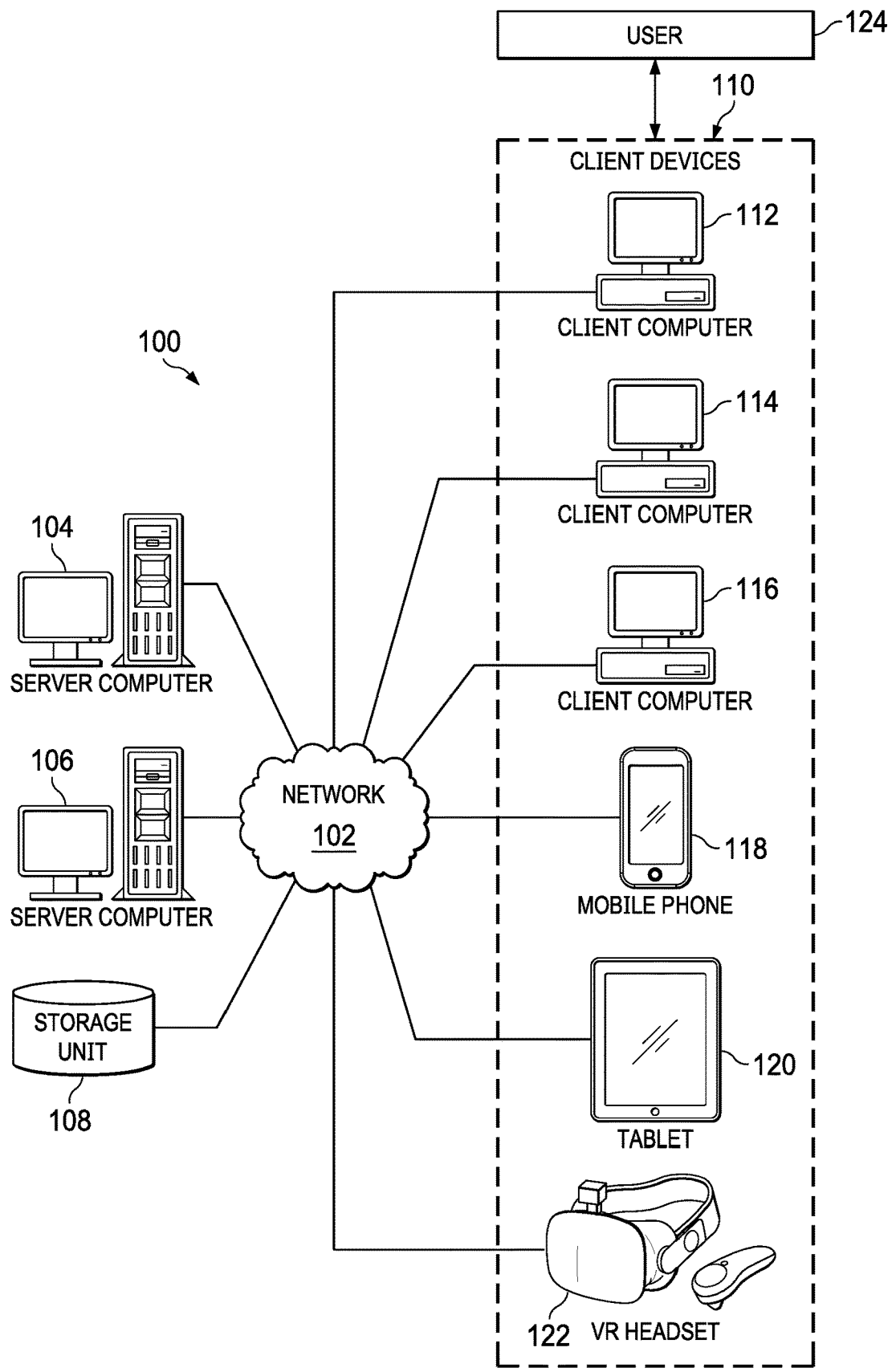
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that VR applications primarily serve the areas of media and entertainment. The illustrative embodiments recognize and take into account that current VR applications do not provide a contextually rich environment for analyzing the risk in financial instruments whose cash flows are heavily dependent on properties and other large fixed-type assets.

Thus, the illustrative examples provide a method, apparatus, system, and computer program product for analyzing financial risk of a financial security. A video is displayed by a computer system on a mobile display system. Object detection is performed on the video by the computer system to identify a fixed asset in the video. The computer system identifies a financial security supported by the fixed asset identified in the video. An overlay of financial data about the financial security is displayed by the computer system in association with the fixed asset in the video. The financial data includes a financial model of the financial security and an assumption of the financial model. The assumption of the financial model is updated by the computer system based on a status of the fixed asset in the video. The financial risk of the financial security is analyzed by the computer system based on the financial model and the assumption that was updated.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 124 operates a mobile display system, such as virtual reality (VR) headset 122, to analyze financial risk of a financial security. User 124 uses VR headset 122 to analyze the financial risk to asset-backed financial security based on the status of the collateralized fixed assets that support the financial security.

As used herein, the term "financial risk" refers to the chance an outcome or investment's actual gains will differ from an expected outcome or return. Financial risk includes the possibility of losing some or all of an original investment in a financial security.

As used herein, the term "financial security" is a fungible, negotiable financial instrument that holds some type of monetary value. It represents an ownership position in a publicly-traded corporation—via stock—a creditor relationship with a governmental body or a corporation—represented by owning that entity's bond—or rights to ownership as represented by an option.

A financial security may be an asset-backed security. As used herein, an asset-backed security (ABS) is a financial security such as a bond or note which is collateralized by a pool of assets such as loans, leases, credit card debt, royalties, or receivables.

Assets backing an asset-backed security may be fixed assets. As used herein, a fixed asset is a long-term tangible piece of property or equipment that a firm owns and uses in its operations to generate income. Fixed assets are not expected to be consumed or converted into cash within a year. Fixed assets most commonly appear on the balance sheet as property, plant, and equipment (PP&E). They are also referred to as capital assets.

As used herein, the term "financial model" is a system, quantitative method, or approach that relies on assumptions and economic, statistical, mathematical, or financial theories and techniques to process data inputs into a quantitative-estimate type of output. These can include scorecards, loan pricing, expected loss models, and unexpected loss models (i.e., economic capital, regulatory capital, stress testing). The purpose of the financial model is to estimate a financial outcome if a certain action is taken or a possible event occurs.

A financial model is also only as good as the inputs and assumptions that go into it. As used herein, the term "assumption" is an estimate of an uncertain variable input into a financial model. Assumptions made to develop a financial model and inputs into the model can vary widely.

Any model is a simplified version of reality, and with any simplification, there is the risk that something will fail to be accounted for. Model risk is a type of financial risk that occurs when a financial model is used to measure quantitative information, and the financial model fails or performs inadequately.

Model risk can affect the outcome of financial securities valuations due to incorrect assumptions. Traders or other investors who use a given financial model may not completely understand its assumptions and limitations, which limits the usefulness and application of the financial model.

Figure 2:
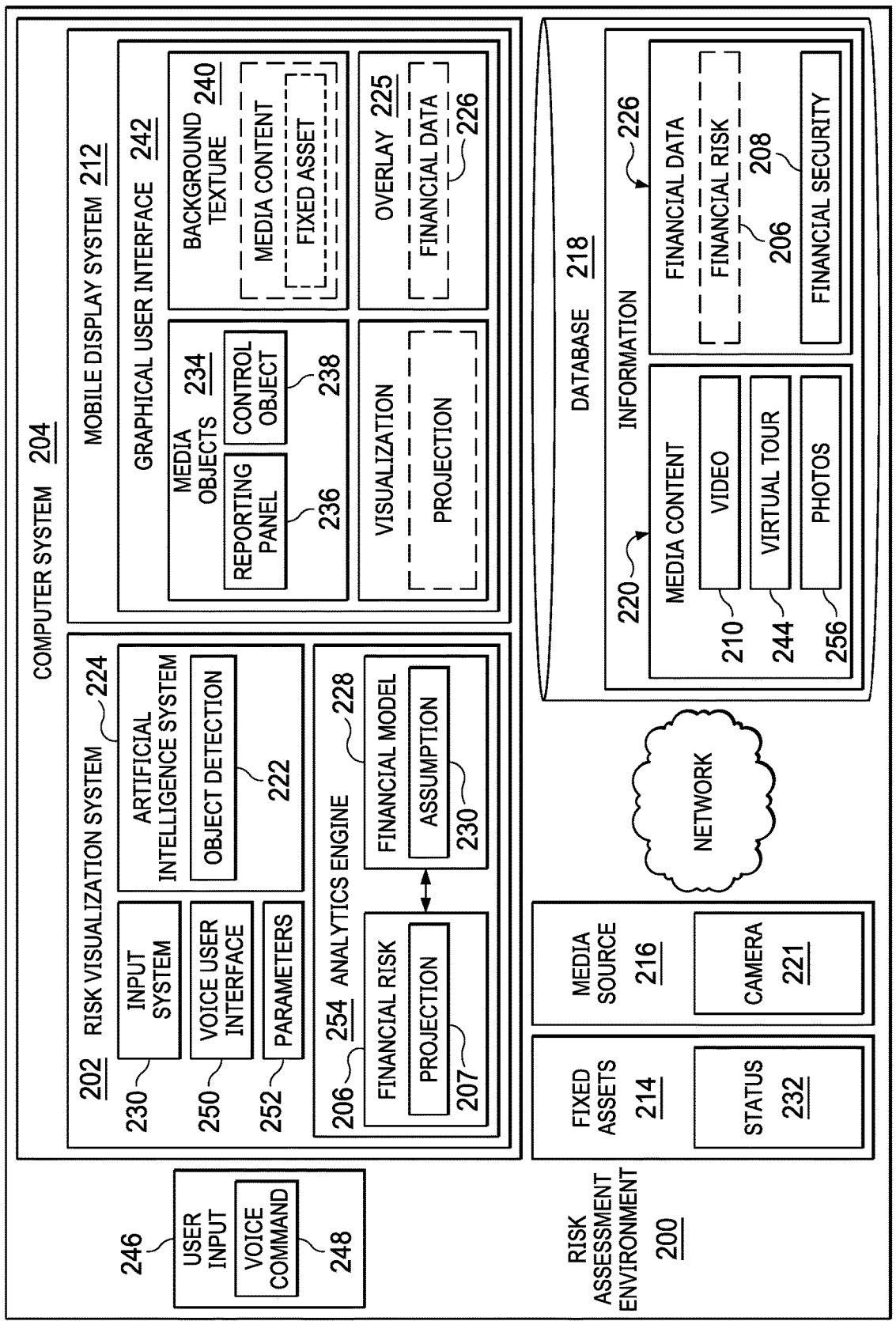
FIG. 2 is a block diagram of a risk assessment environment in accordance with an illustrative embodiment.

With reference now to FIG. 2, a block diagram of a risk assessment environment is depicted in accordance with an illustrative embodiment. In this illustrative example, risk assessment environment 200 includes components that can be implemented in hardware such as the hardware shown in network data processing system 100 in FIG. 1.

In this illustrative example, risk visualization system 202 can be used to analyze financial risk 206 of financial security 208. In this illustrative example, risk visualization system 202 can be implemented in computer system 204. Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

Risk visualization system 202 can be implemented in software, hardware, firmware, or a combination thereof. When software is used, the operations performed by risk visualization system 202 can be implemented in program code configured to run on hardware, such as a processor unit. When firmware is used, the operations performed by risk visualization system 202 can be implemented in program code and data and stored in persistent memory to run on a processor unit. When hardware is employed, the hardware may include circuits that operate to perform the operations in risk visualization system 202.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, risk visualization system 202 displays a set of media objects 234 in graphical user interface 242 of mobile display system 212. Each one of media objects 234 has a texture that corresponds to media content 220. In one illustrative example, the set of one or more media objects 234 includes one or more of reporting panel 236 and control object 238.

A control is a graphical and/or functional element that can be reused across graphical user interface (GUI) applications and which the user can select and activate to get additional information. A control, in a graphical user interface, is an object on the screen that can be manipulated by the user to perform some action. A button is a common type of control.

Control object 238 corresponds to a media content 220. For example, control object 238 can be an object associated with virtual tour 244 of fixed assets 214 supporting the financial security 208. In another example, control object 238 can be an object associated with video 210 of fixed assets 214 supporting financial security 208.

In one illustrative example, rendered objects are implemented through use of Javascript with WebGL and WebVR API's. Photos, videos, and data are domiciled in cloud-based data stores which are then called by the Javascript.

A panel is a particular arrangement of information grouped together for presentation to users in a window or pop-up. In this illustrative example, reporting panel 236 includes financial data 226 about financial security 208.

In one illustrative example, risk visualization system 202 updates background texture 240 of graphical user interface 242 responsive to a selection of one of media objects 234. Risk visualization system 202 updates background texture 240 to display the media content of the media object that was selected.

For example, risk visualization system 202 can receive user input 246 that selects control object 238 corresponding to video 210. Responsive to receiving the selection, risk visualization system 202 displays video 210 as background texture 240 of graphical user interface 242.

In this illustrative example, user input 246 can be received through input system 230. A user can interact with graphical user interface 242 through user input 246 received through input system 230, which is a physical hardware system. Input system 230 can be selected from at least one of a mouse, a keyboard, a trackball, a touchscreen, a stylus, a motion-sensing input device, a cyber glove, or some other suitable type of input device. Mobile display system 212 and input system 230 form a human machine interface (HMI). In one illustrative example, input system 230 is a virtual reality (VR) remote or VR motion controller.

In this illustrative example, risk visualization system 202 in computer system 204 displays video 210 on mobile display system 212. Video 210 is a video that includes footage of fixed assets 214. In this illustrative example, fixed assets 214 are tangible assets that support financial security 208. Fixed assets 214 can be, for example, one or more commercial buildings, factories, airplanes, and private residences, as well as other properties and large fixed-type assets.

In the illustrative example, mobile display system 212 can be a virtual reality headset. A virtual reality headset is a head mounted device that provides a virtual reality experience for the wearer, often incorporating a stereoscopic display, stereo sound, and one or more motion-tracking sensors, such as gyroscopes, accelerometers, magnetometers, and structured light systems. The virtual reality headset can be a commercially available headset, such as, for example, Oculus, HTC Vive, Google™ Daydream headset.

In one illustrative example, video 210 can be received from media source 216 and stored in database 218. Media source 216 can include one or more different sources of media content 220. For example, media source 216 can be a dedicated service for recording and providing media content 220 to risk visualization system 202. In another example, media source 216 can be a publicly available content source, such as Acquire Media Co., Google News, developed by Alphabet Inc., or S&P Market Intelligence (MI) News. Media content 220 can be recorded using camera 221, which can be mounted on an aerial vehicle, such as a drone or helicopter.

Risk visualization system 202 performs object detection 222 on video 210 to identify fixed assets 214 in video 210. In one illustrative example, risk visualization system 202 performs object detection 222 using artificial intelligence system 224.

In this illustrative example, artificial intelligence system 224 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

Turning now to a discussion of machine learning which can be used to implement various embodiments of this disclosure, there are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Using one or more machine learning algorithms, artificial intelligence system 224 can detect the presence of an object in video 210. These objects can include any tangible piece of property, equipment, or some other fixed asset used to support a financial security, such as financial security 208. In addition to detecting whether an object is present, the object also may be recognized as being a particular one of fixed assets 214. In the illustrative examples, artificial intelligence system 224 can be in communication with a database correlating features to an identity of fixed assets 214. The processor can identify the object as one of fixed assets 214 using the information available via the database.

Risk visualization system 202 identifies financial security 208 supported by fixed assets 214 identified in video 210. In the illustrative examples, risk visualization system 204 can be in communication with a database correlating fixed asset 214 to financial security 208. The processor can identify financial security 208 using the information available via the database.

In one illustrative example, risk visualization system 202 displays overlay 225 of financial data 226 about financial security 208. Overlay 226 is displayed in association with fixed assets 214 in video 210. Financial data 226 includes financial model 228 of financial security 208, and assumption 230 of financial model 228.

Risk visualization system 202 updates assumption 230 of financial model 228 based on status 232 of fixed assets 214 in video 210. Status 232 is a physical condition of fixed asset 214 that can impact financial risk 206 associated with financial security 208. For example, status 232 may indicate financial impairment of fixed assets 214.

In one illustrative example, updating the assumption of the financial model can include receiving a voice command over a voice user interface. Through a combination of natural language processing, automatic speech recognition (ASR), and artificial intelligence (AI) technology, voice user interface (VUI) allows people to interact with risk visualization system 202 through voice command 248.

Using voice user interface 250, risk visualization system 202 extracts parameters 252 from voice command 248. In this illustrative example, parameters 252 are one or more values assigned to assumption 230 of financial model 228.

In one illustrative example, upon recognizing the speech signals (e.g. "show me annual percentage change in bond balance for Deal ABC"), the service extracts the parameters from the voiced intents and pushes them to an analytics engine which uses them to query against a data store.

Risk visualization system 202 updates the assumption 230 of the financial model 228 with the parameters 252 extracted from the voice command 248. Using analytics engine 254, risk visualization system 202 can then determine financial risk 206 of fixed assets 214 based on updated ones of parameters 252.

In one illustrative example, projection 207 of financial risk 206 is determined using financial model 228 and based on the updated ones of parameters 252. Projection 207 is a visualization of financial risk 206. In one illustrative example, data for chart visualization is pulled into the graphics engine through script that activates the voice user service for executing voice input commands. The query results are sent back to the graphics engine for visual rendering.

In one illustrative example, risk visualization system 202 uses artificial intelligence system 224 to identify status 232 of fixed assets 214 in video 210. Based on status 232 of fixed assets 214 identified from video 210, artificial intelligence system 224 predicts parameters 252 for financial model 228. Analytics engine 254 updates assumption 230 of financial model 228 with parameters 252 predicted by artificial intelligence system 224.

Continuing with the current example, risk visualization system 202 receives voice command 248 over voice user interface 250. Using voice user interface 250, risk visualization system 202 extracts parameters 252 from voice command 248. In this illustrative example, artificial intelligence system 224 uses parameters 252 to create a labeled dataset that can be used to reinforce one or more machine learning algorithms used by artificial intelligence system 224 to identify status 232 of fixed assets 214. In this manner, artificial intelligence system 224 is updated based on parameters 252 extracted from voice command 248.

Computer system 204 can be configured to perform at least one of the steps, operations, or actions described in the different illustrative examples using software, hardware, firmware, or a combination thereof. As a result, computer system 204 operates as a special purpose computer system in which risk visualization system 202 in computer system 204 enables a contextuality rich environment for analyzing the risk in financial instruments whose cash flows are heavily dependent on properties and other large fixed-type assets. In particular, risk visualization system 202 transforms computer system 204 into a special purpose computer system as compared to currently available general computer systems that do not have risk visualization system 202.

The illustration of risk assessment environment 200 and the different components in risk assessment environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
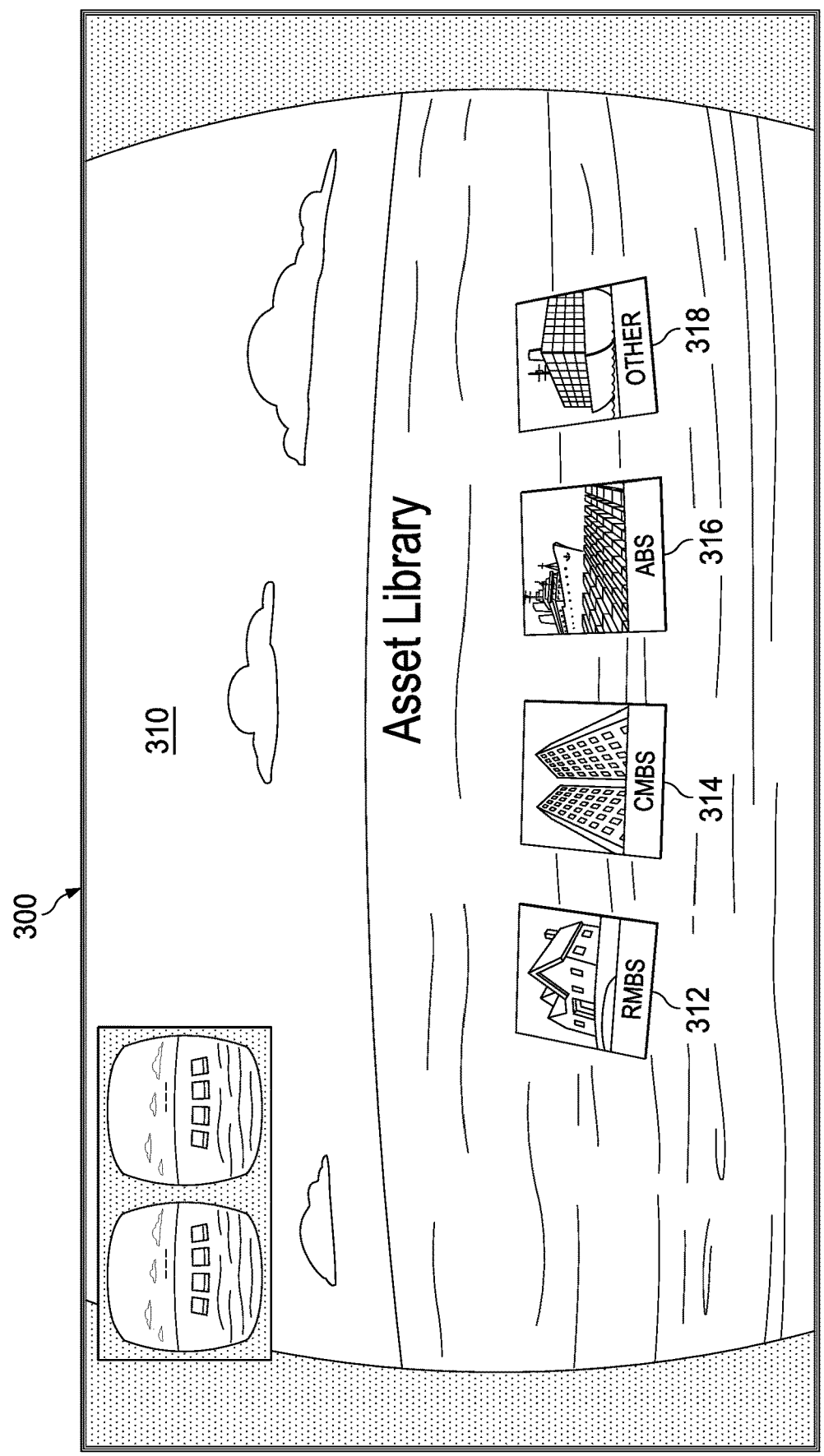
FIG. 3 is an illustration of a frontward view of a first view sphere of a graphical user interface used for analyzing financial risk of a financial security in accordance with an illustrative embodiment.

With reference now to FIG. 3, an illustration of a frontward view of a first view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

View 310 provides a designated section for accessing one or more libraries of media content pertaining to fixed assets supporting one or more financial securities. Navigation icons 312, 314, 316 and 318 provide access to financial assets categorized under the given asset type. Using a VR controller, a user can select a given icon to navigate to the associated library of categorized securitizations.

Figure 4:
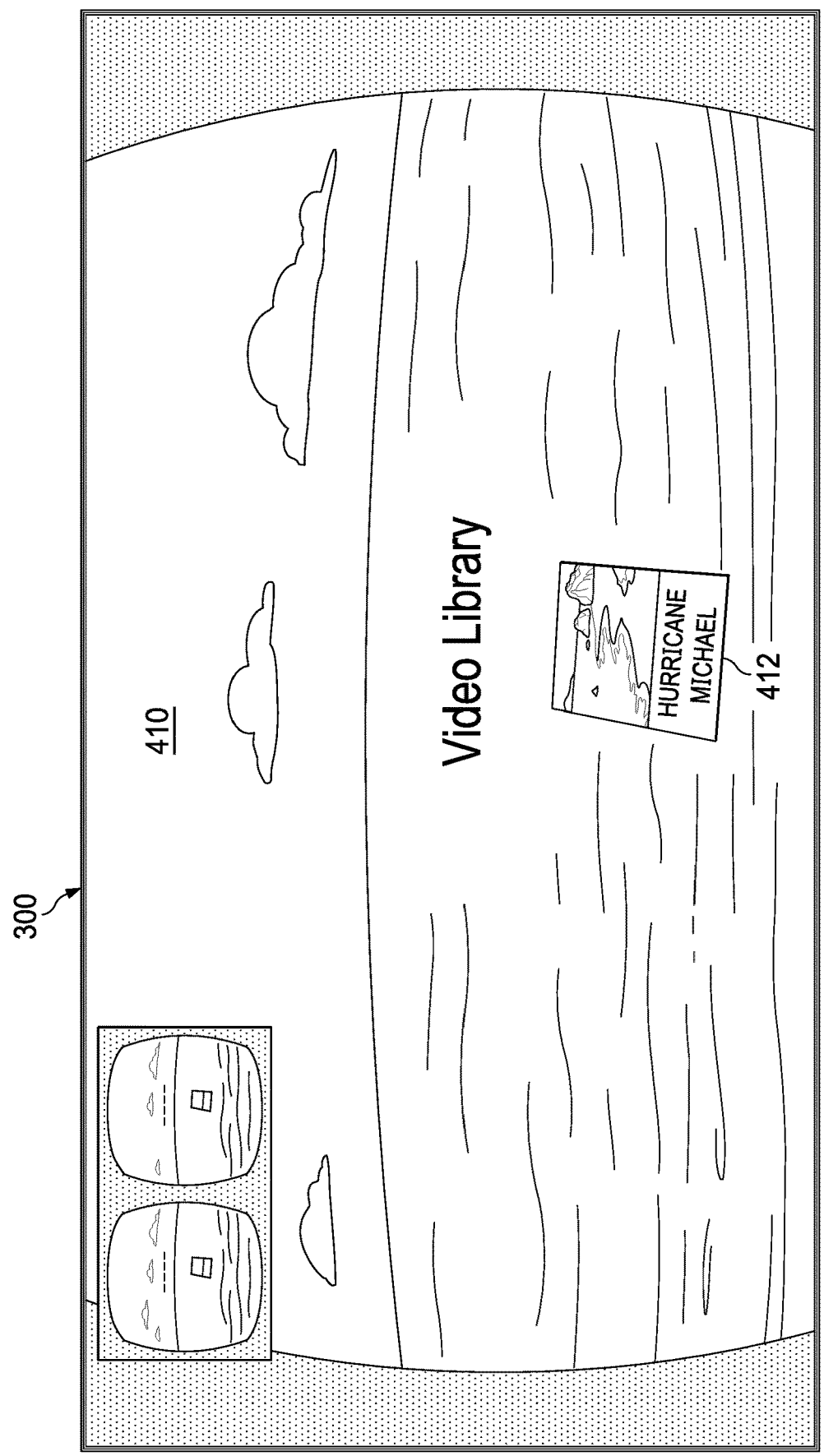
FIG. 4 is an illustration of a rightward view of the first view sphere of a graphical user interface used for analyzing financial risk of a financial security in accordance with an illustrative embodiment.

With reference now to FIG. 4, an illustration of a rightward view of a first view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

View 410 provides a designated section for accessing one or more libraries of 360-degree videos pertaining to fixed assets supporting one or more financial securities. Using a VR controller, a user can select video icon 412 to navigate to and play the given video as labeled.

Figure 5:
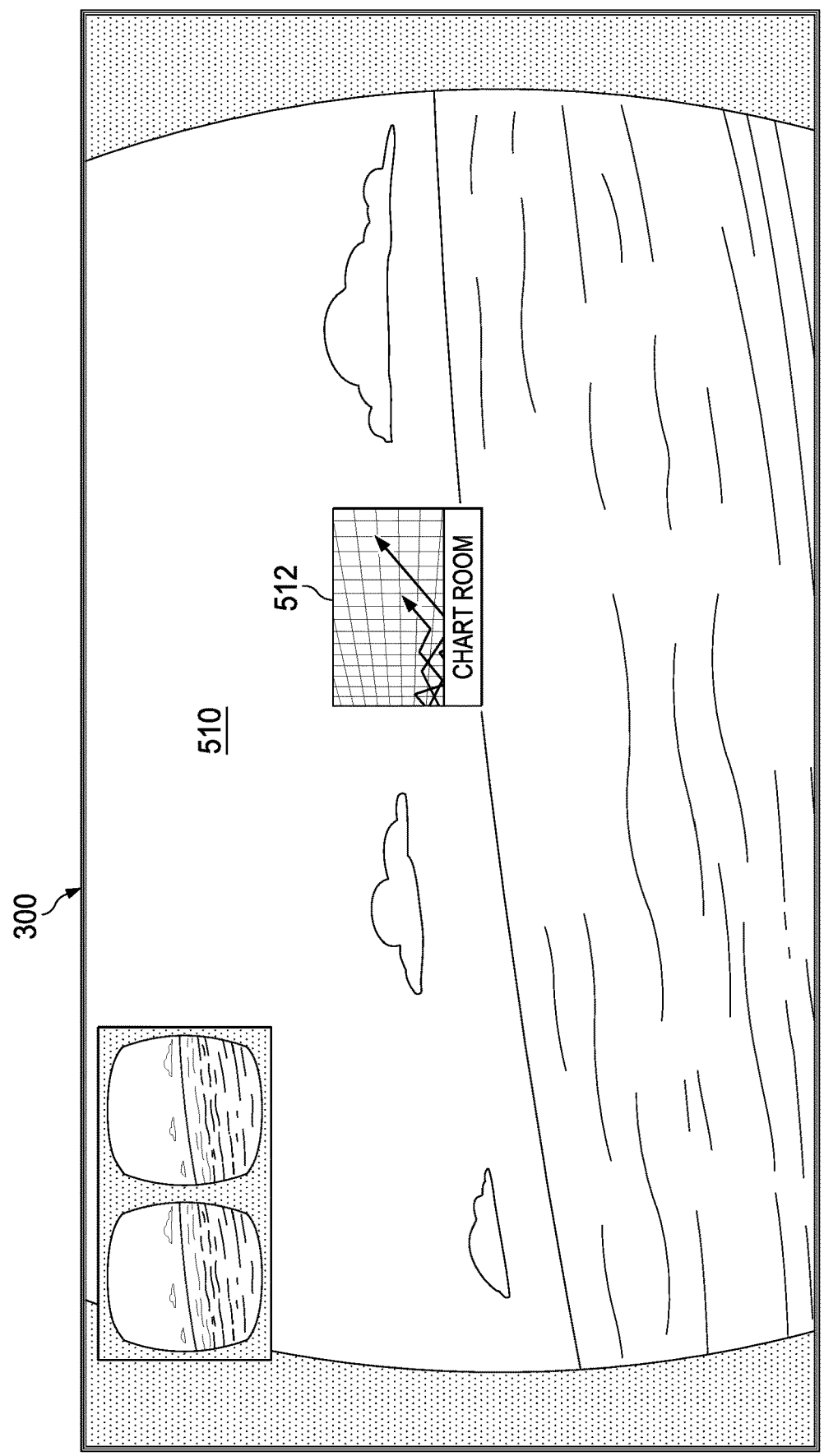
FIG. 5 is an illustration of a leftward view of a first view sphere of a graphical user interface used for analyzing financial risk of a financial security in accordance with an illustrative embodiment.

With reference now to FIG. 5, an illustration of a leftward view of a first view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

View 510 provides a designated section for accessing a chart view for rendering projections of financial risk. Using a VR controller, a user can select chart icon 512 to access the associated view sphere for rendering charts projecting the financial risk to a particular financial security.

Figure 6:
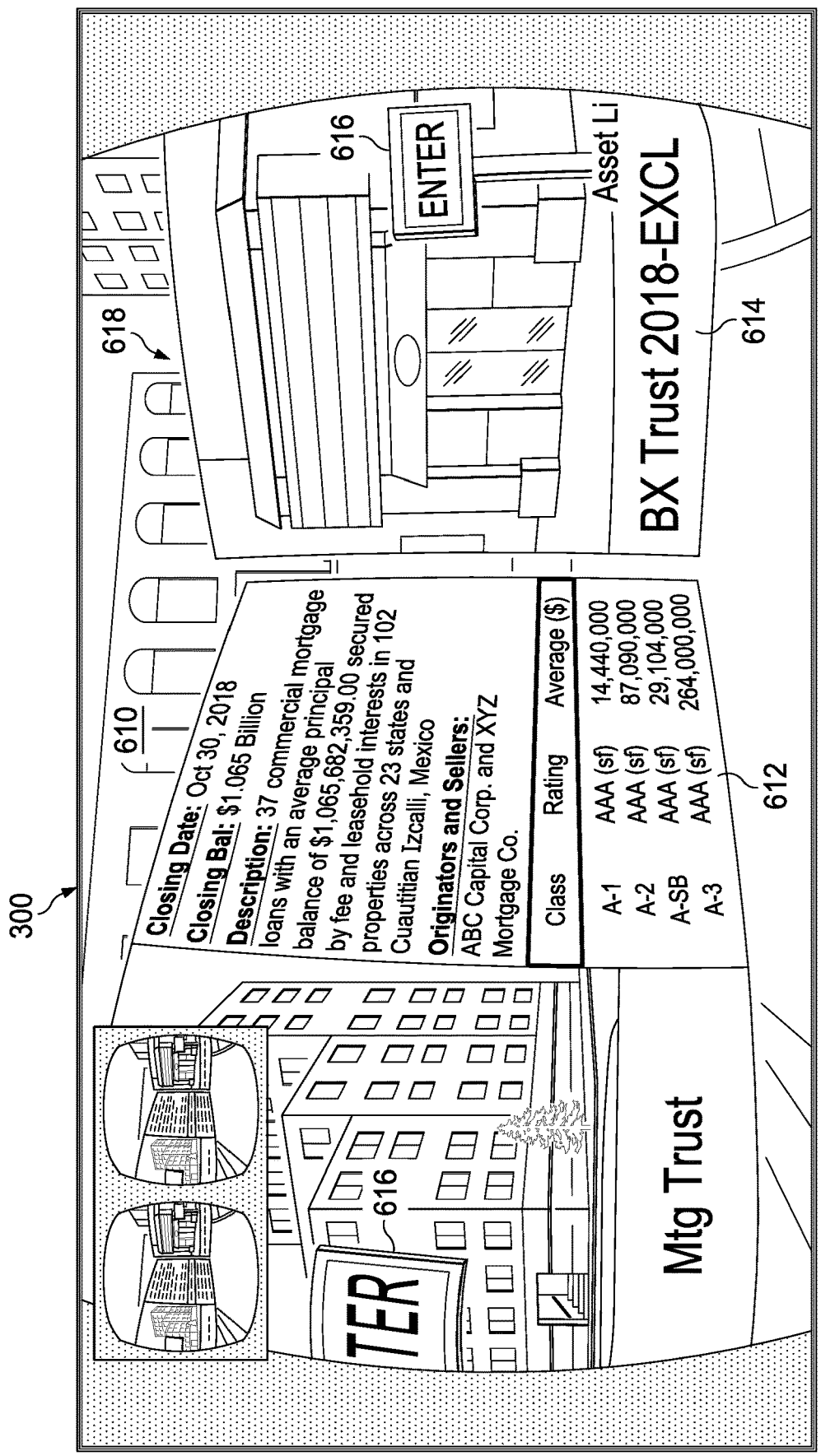
FIG. 6 is an illustration of a frontward view of a second view sphere of a graphical user interface used for analyzing financial risk of a financial security in accordance with an illustrative embodiment.

With reference now to FIG. 6, an illustration of a frontward view of a second view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

In this illustrative example, view 610 is accessed in response to a selection of navigation icon 314 of FIG. 3. As depicted, background texture 618 on graphical user interface 300 changes to a picture associated with the selected navigation icon.

As depicted, view 610 displays reporting panel 612 and 614, which are examples of reporting panel 236 of FIG. 2. As depicted, each of reporting panels 612 and 614 is a summary of details of a particular security. Each of reporting panels 612 and 614 is displayed alongside a two-dimensional photo of a fixed asset supporting the associated financial security. Photos are examples of photos 256 of FIG. 2.

Using a VR controller, a user can select a particular security, such as by selecting "Enter button" 616 overlaying reporting panel 612 to access a different view screen containing additional 360-degree photos and panels of information for a given security.

Figure 7:
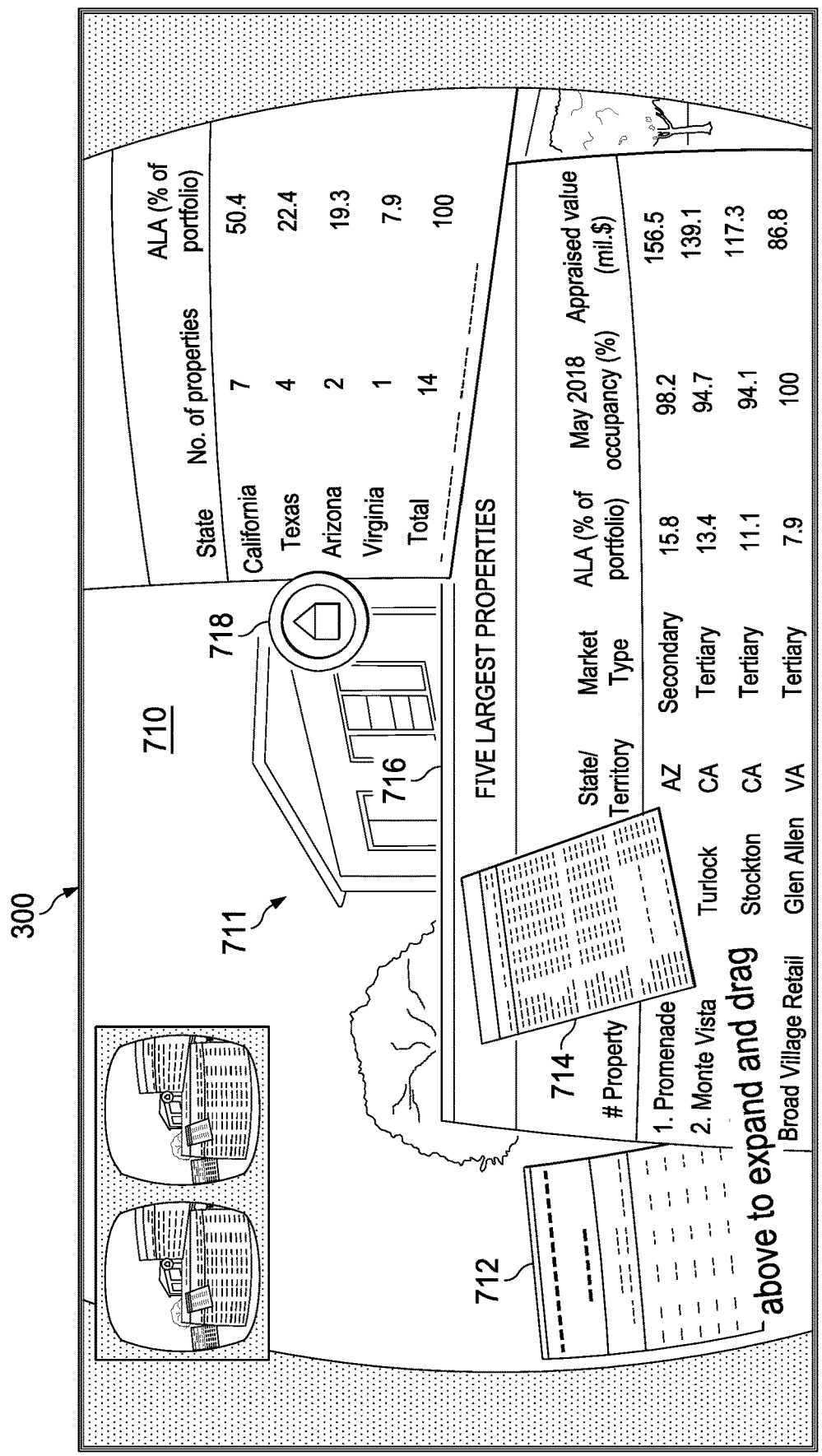
FIG. 7 is an illustration of a frontward view of a third view sphere of a graphical user interface used for analyzing financial risk of a financial security in accordance with an illustrative embodiment.

With reference now to FIG. 7, an illustration of a frontward view of a third view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

In this illustrative example, view 710 is accessed in response to a particular financial security from view 610 of FIG. 6. As depicted, background texture 711 on graphical user interface 300 changes to a picture associated with the selected financial security.

As depicted, view 710 displays reporting panel 712 and 714, which are examples of reporting panel 236 of FIG. 2. When selected, each of reporting panel 712 and 714 expands into a larger version of itself to more easily view its displayed contents.

"Blown-out reporting panel" 716 is an expanded view of reporting panel 712. Using a VR controller, a user can select a particular security. "Blown-out reporting panel" 716 is displayed in response to a selection of reporting panel 712.

Using a VR controller, a user can grab "blown-out reporting panel" 716 by ray beam. The user can then shuffle "Blown-out reporting panel" 716 around the screen so as not to obscure additional content. "Selecting home" button 718 sends the user back to view 310 of FIG. 3.

Figure 8:
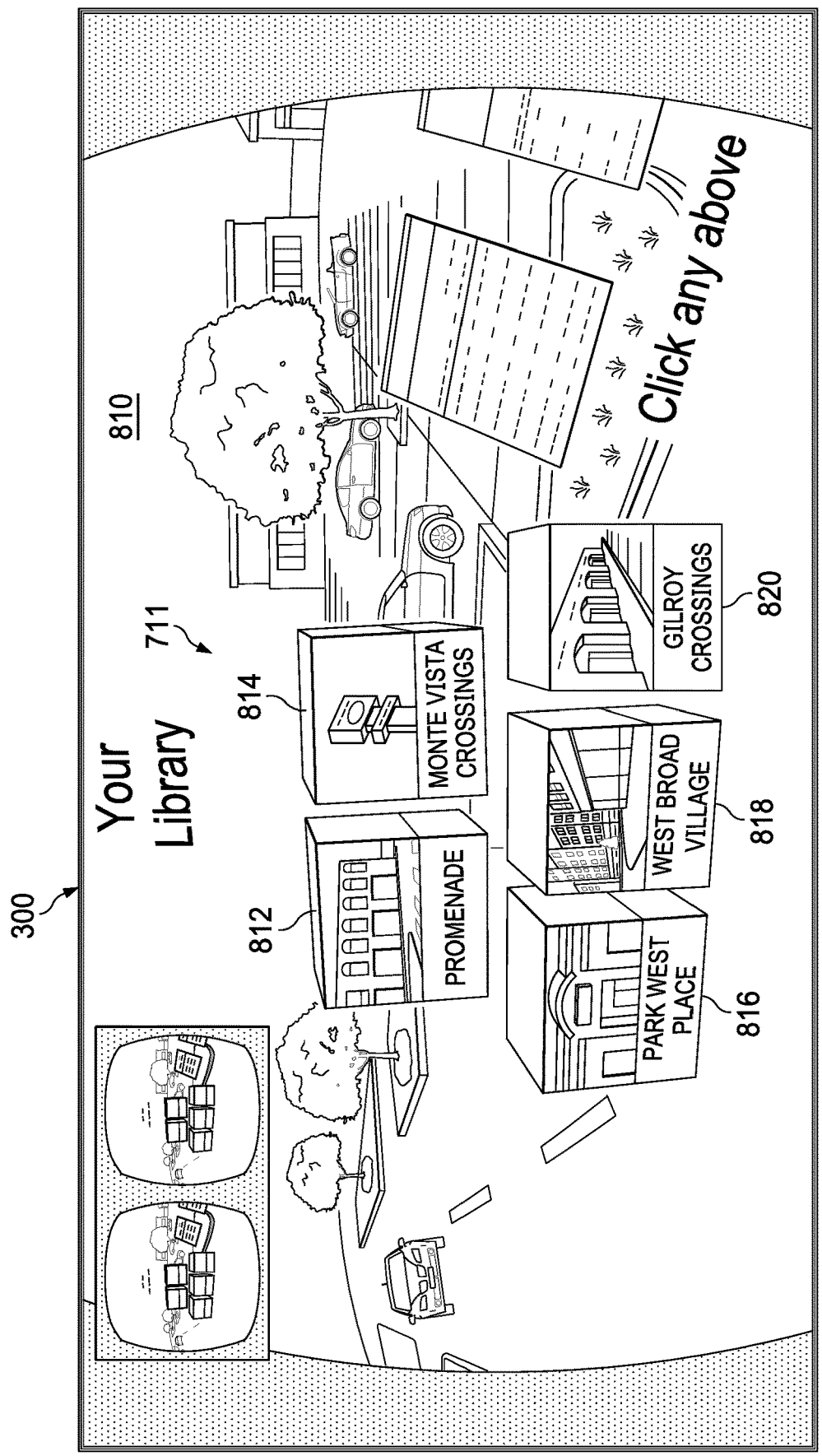
FIG. 8 is an illustration of a leftward view of a third view sphere of a graphical user interface used for analyzing financial risk of a financial security in accordance with an illustrative embodiment.

With reference now to FIG. 8, an illustration of a leftward view of a third view sphere of a graphical user interface used for analyzing financial risk of a financial security is depicted in accordance with an illustrative embodiment. As depicted, graphical user interface 300 is a graphical user interface displayed on a virtual reality headset, as in one embodiment of a graphical user interface 242 for mobile display system 212, both shown in block form in FIG. 2.

As depicted, view 810 displays clickable "tour cubes" 812, 814, 816, 818, and 820. Each tour cube corresponds to a virtual tour, such as virtual tour 244 of FIG. 2, of a related fixed asset. In this illustrative example, each tour cube is also labeled with a name of a fixed asset associated with the virtual tour. Background texture 711 on graphical user interface 300 changes according to what is rendered on the tour cube in response to a user selection.

Figure 9:
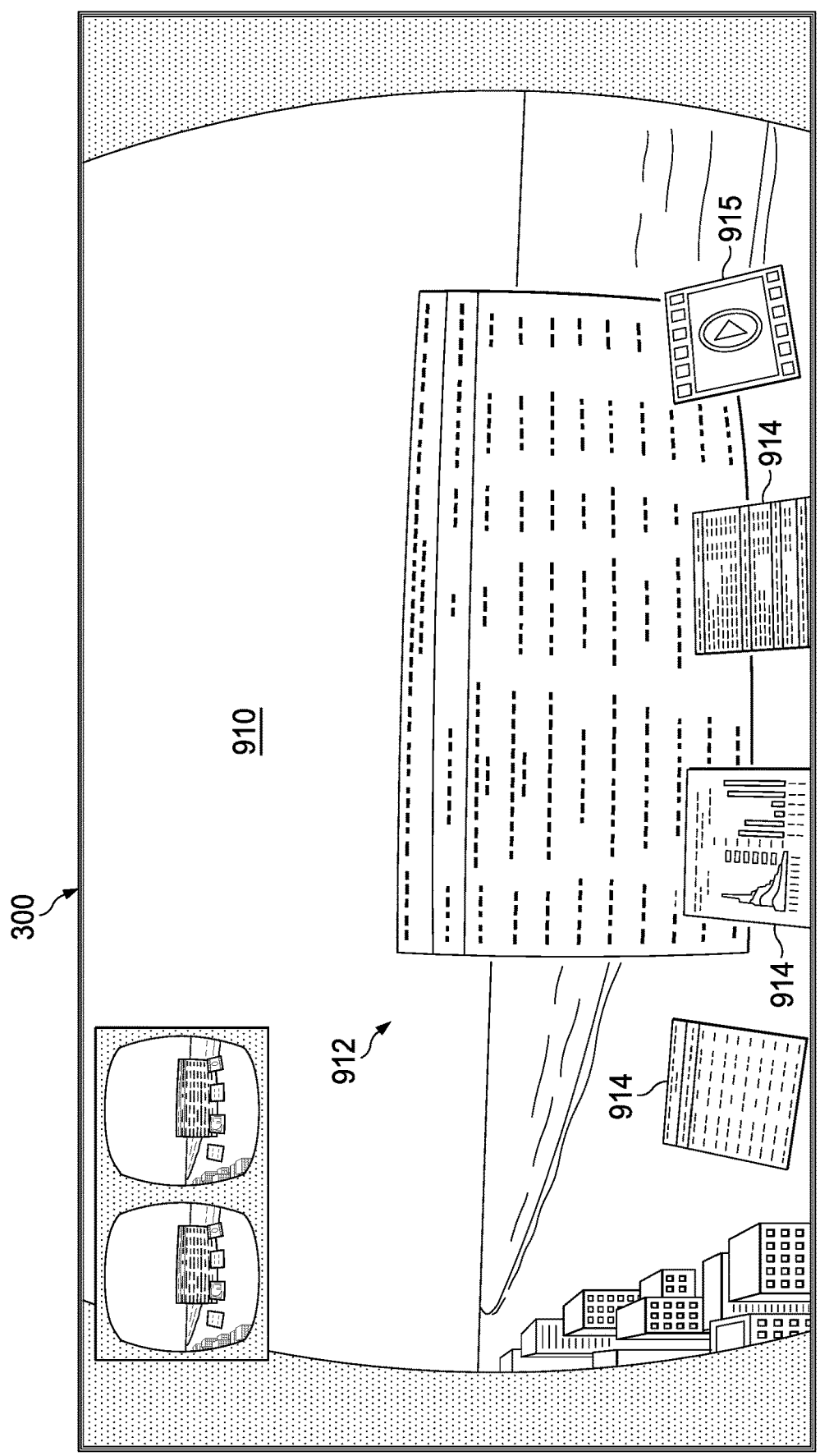
FIG. 9 is a first illustration of a frontward view of a fourth view sphere of a graphical user interface used for analyzing financial risk of a financial security in accordance with an illustrative embodiment.

With reference now to FIG. 9, a first illustration of a frontward view of a fourth view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

As depicted, view 910 displays video 912 in response to a selection of a video icon, such as video icon 412 of FIG. 4. In response to the selection of the "video icon", video 912 automatically runs as a background texture.

As depicted, view 910 displays one or more media objects, which are examples of media objects 234 of FIG. 2. When selected, each of media objects 914 expands into a larger version of itself to more easily view its displayed contents.

Figure 10:
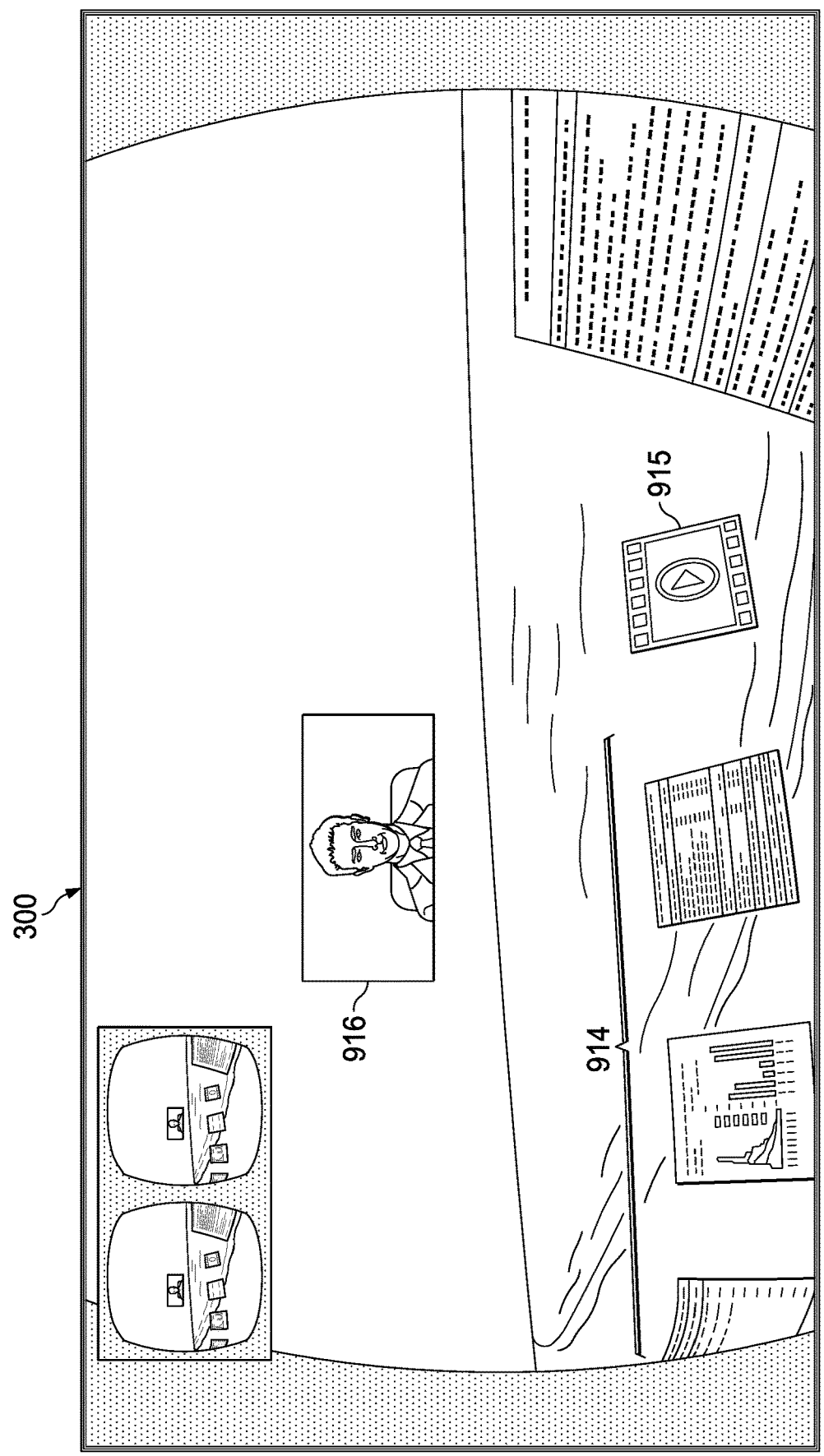
FIG. 10 is a second illustration of a frontward view of a fourth view sphere of a graphical user interface used for analyzing financial risk of a financial security is depicted in accordance with an illustrative embodiment.

With reference now to FIG. 10, a second illustration of a frontward view of a fourth view sphere of a graphical user interface used for analyzing financial risk of a financial security is depicted in accordance with an illustrative embodiment. As depicted, graphical user interface 300 is a graphical user interface displayed on a virtual reality headset, as in one embodiment of a graphical user interface 242 for mobile display system 212, both shown in block form in FIG. 2.

In this illustrative example, media objects 914 include video object 915. When selected, an associated video is overlayed on the sphere background texture—but much smaller in size—while muting the sound on the video currently displayed as the background texture. "Expanded video panel" 916 plays while a sphere video continues.

Using a VR controller, "expanded video panel" 916 can be grabbed and shuffled so as not to obscure additional content.

Figure 11:
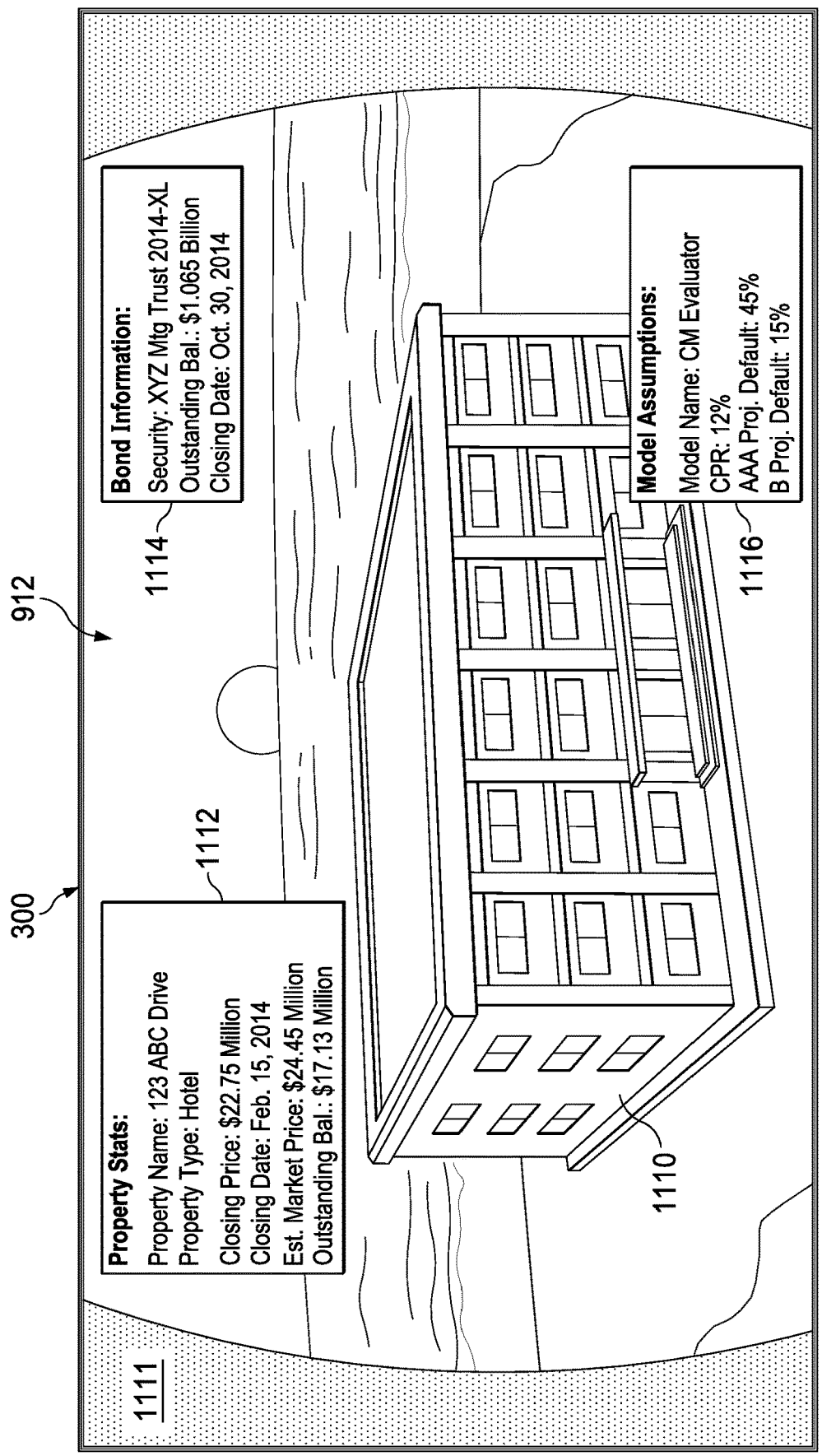
FIG. 11 is a third illustration of a frontward view of a fourth view sphere of a graphical user interface used for analyzing financial risk of a financial security in accordance with an illustrative embodiment.

With reference now to FIG. 11, a third illustration of a frontward view of a fourth view sphere of a graphical user interface used for analyzing financial risk of a financial security is depicted in accordance with an illustrative embodiment. As depicted, graphical user interface 300 is a graphical user interface displayed on a virtual reality headset, as in one embodiment of a graphical user interface 242 for mobile display system 212, both shown in block form in FIG. 2.

In this illustrative example, video 912 depicts fixed asset 1110. Fixed asset 1110 is an example of fixed asset 214 shown in block form in FIG. 2.

As depicted, view 1111 includes overlays 1112, 1114, and 1116. Each of overlays 1112, 1114, and 1116 is an example of overlay 224 shown in block form in FIG. 2. In this illustrative example, overlay 1112 includes information about the fixed asset; overlay 1114 includes information about the associated financial security; and overlay 1116 includes information about a financial model and assumptions used to determine the financial risk of the associated financial security.

Figure 12:
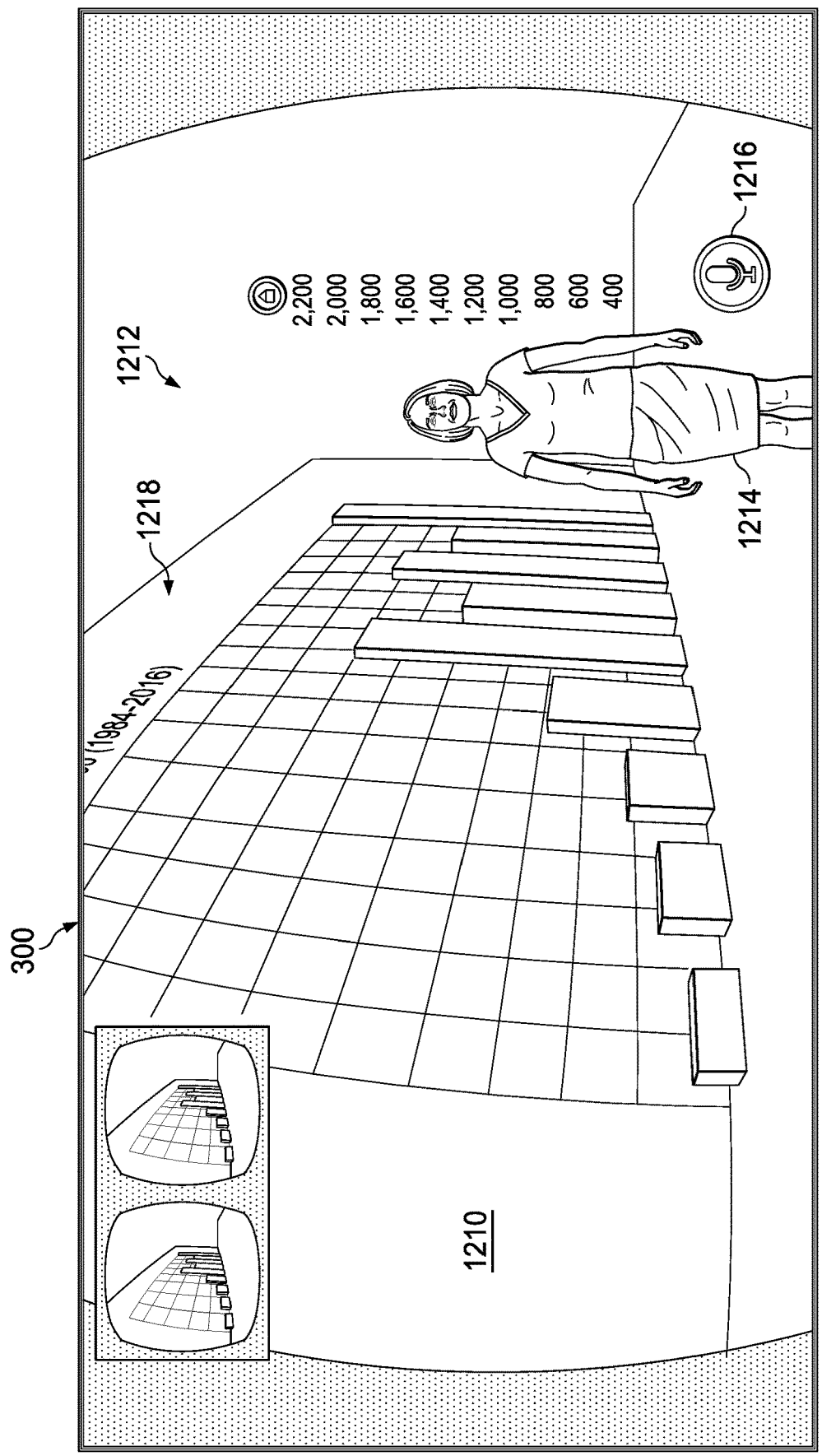
FIG. 12 is an illustration of a frontward view of a fifth view sphere of a graphical user interface used for analyzing financial risk of a financial security in accordance with an illustrative embodiment.

With reference now to FIG. 12, an illustration of a frontward view of a fifth view sphere of a graphical user interface used for analyzing financial risk of a financial security is depicted in accordance with an illustrative embodiment. As depicted, graphical user interface 300 is a graphical user interface displayed on a virtual reality headset, as in one embodiment of a graphical user interface 242 for mobile display system 212, both shown in block form in FIG. 2.

In this illustrative example, view 1210 is accessed in response to the selection of a particular one of chart icon 512 from FIG. 5. As depicted, background texture 1212 on graphical user interface 300 changes to a chart of the projected financial risk.

In this illustrative example, voice user interface 250 is depicted in view 1210 as digital assistant 1214. When the voice user interface is activated, for example, by selecting "Microphone" button 1216, the voice user interface is able to respond to voiced parameters from a user for generating a chart 1218, projecting the financial risk according to the voiced parameters.

Figure 13:
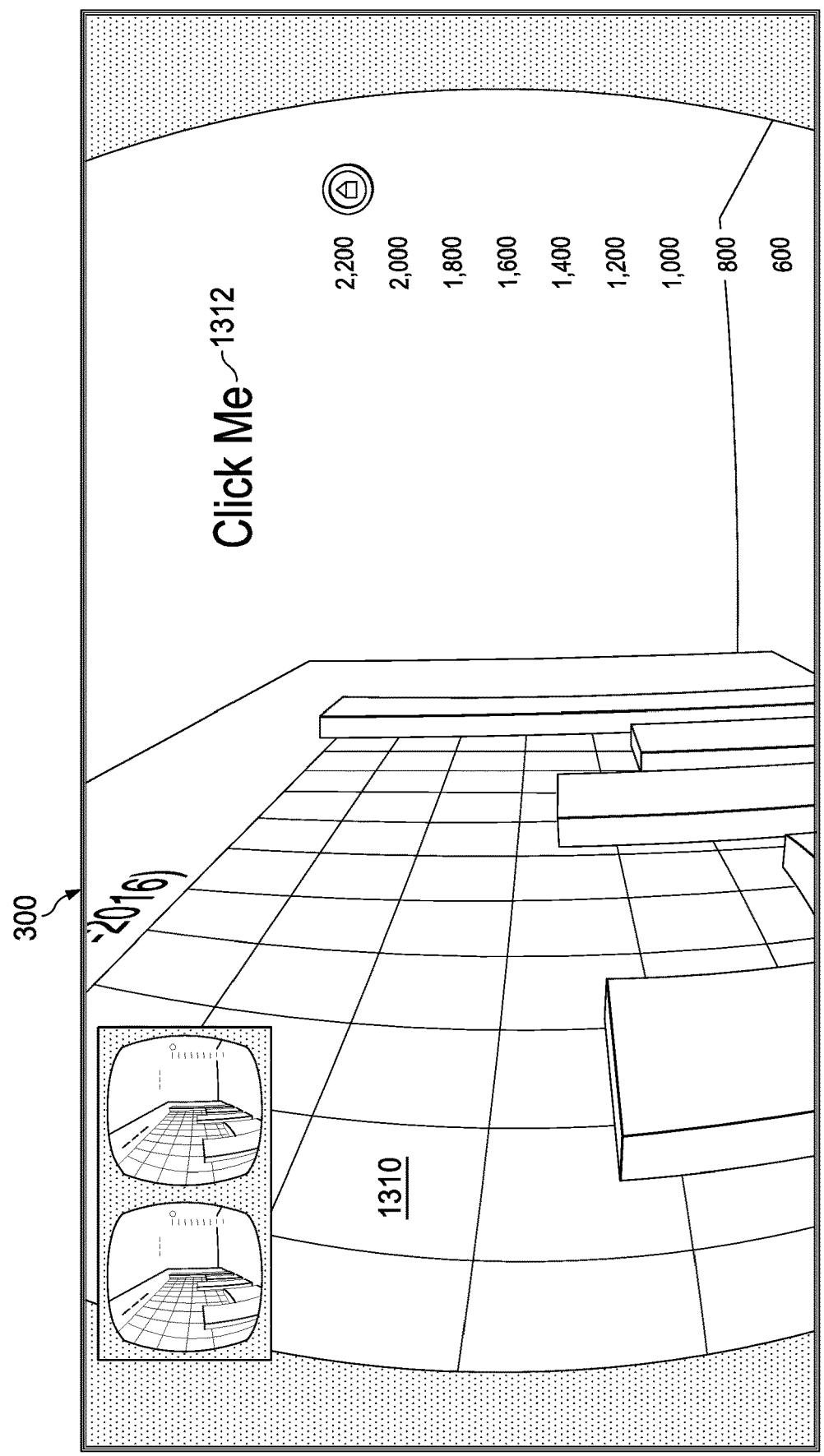
FIG. 13 is an illustration of a frontward view of a fifth view sphere of a graphical user interface used for analyzing financial risk of a financial security in accordance with an illustrative embodiment.

With reference now to FIG. 13, an illustration of a frontward view of a fifth view sphere of a graphical user interface used for analyzing financial risk of a financial security is depicted in accordance with an illustrative embodiment. As depicted, graphical user interface 300 is a graphical user interface displayed on a virtual reality headset, as in one embodiment of graphical user interface 242 for mobile display system 212, both shown in block form in FIG. 2.

In this illustrative example, "Teleporter" icon 1312 changes the user's point-of-view of the rendered chart. For example, "Teleporter" icon 1312 can toggle between view 1210 of FIG. 12 and view 1310 of FIG. 13.

The following narrative describes a use case scenario for the risk visualization system in which an investor or analyst focused in the asset-backed securities market is seeking relevant information for a given instrument or obtaining more context around real-world events that could impact their risk exposure on their portfolio holdings.

An investor hears about a hurricane tearing through a particular geographic region. Knowing the investor has certain commercial property holdings within that region, the investor would like to seek out further information in order to gauge potential exposure. Although the investor is currently stuck on a commuting train, and still hours away from the office workstation, the investor does have access to mobile display system, such as mobile display system 212 of FIG. 2.

The investor puts on mobile display system 212 and logs into risk visualization system 202, for example, using a subscription account. After navigating to the appropriate view sphere, the investor finds a video recently uploaded of an aerial damage survey of a town that was one of the areas hardest-hit by a hurricane. Seen through the eyes of a three-dimensional camera mounted on an aerial vehicle, such as a drone or helicopter, the video gives an up-close and personal view of the devastation that cannot be captured by words.

As certain properties come into view, an overlay of information, such as overlay 224 of FIG. 2, pops up noting which financial securities are supported by the fixed asset. Subsequently, multiple tables appear as overlays listing all securities considered to be impacted by the hurricane because of their asset profiles. One particular table lists all securities whose pools of supporting assets consist of 10% or more commercial properties within the path of the hurricane. Here, the investor recognizes several securities as being included in her portfolio. The investor is easily able to shuffle the tables around the user interface using a VR controller, so as to continue undisturbed viewing of the aerial damage, while still keeping the additional information close by for added context.

Additionally, the investor is able to view specific assumptions that an associated commercial loss model had assigned for each unit, such as an estimated market price and expected loss percentage from foreclosure. Given this data under the latest circumstances, the investor can quickly begin to surmise the potential dollar loss to their financial holdings.

To get an even better sense of their potential exposure, the investor decides to take a deeper dive into their holdings by accessing one or more virtual tours of the fixed asset. There, the investor is able to perform a virtual walk-through of the fixed assets underlying their securities. Again, the investor is able to bring up overlays of data. For example, the investor can view historical cash flow remittances from the secured properties.

To get a more accurate projection of what the destroyed properties will have on future returns, the investor would like to run the financial model with re-calibrated assumptions. After voicing intents through a voice user interface (e.g., "show me 5-year cumulative loss projection assuming average loss severity of 80% and cumulative default rate of 50%"), the investor navigates to the charts library and provides a handful of visual parameters to the digital assistant. After a few seconds, the investor sees a three-dimensional bar graph appear displaying annual projected loss percentage over five years.

Turning next to FIG. 14, a flowchart of a process for analyzing financial risk of a financial security is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in by risk visualization system 202 in computer system 204 in FIG. 2.

The process beings by displaying a video on a mobile display system (step 1410). The process performs object detection on the video to identify a fixed asset in the video (step 1420). The process identifies a financial security supported by the fixed asset identified in the video (step 1430).

The process displays an overlay of financial data about the financial security in association with the fixed asset in the video (step 1440). The financial data includes a financial model of the financial security and an assumption of the financial model.

The process updates the assumption of the financial model based on a status of the fixed asset in the video (step 1450). The process analyzes the financial risk of the financial security based on the financial model and the assumption that was updated (step 1460). The process terminates thereafter.

With reference next to FIG. 15, a flowchart of a process for updating the assumption of the financial model is depicted in accordance with an illustrative embodiment. The process illustrated in FIG. 15 is an example of one manner in which step 1450 in FIG. 14 can be implemented.

Continuing from step 1440 of FIG. 14, the process receives a voice command over a voice user interface (step 1510). The process extracts parameters from the voice command (step 1520). The process updates the assumption of the financial model with the parameters extracted from the voice command (step 1530). Thereafter, the process can continue to step 1460 of FIG. 14.

Figure 16:
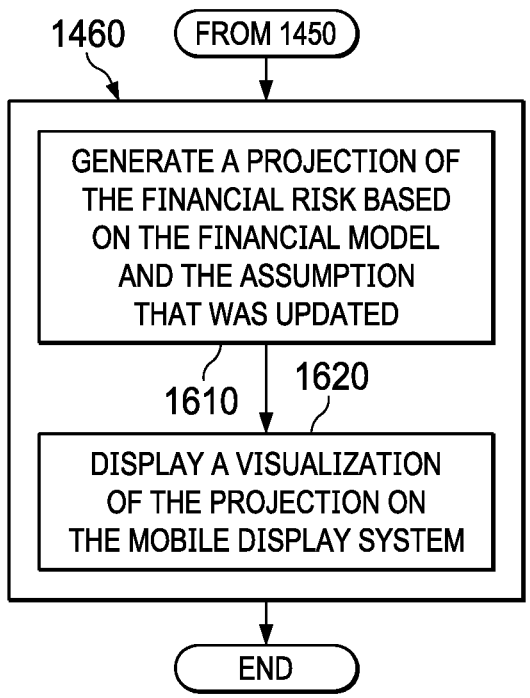
FIG. 16 is a more detailed flowchart of a process for analyzing the financial risk of the financial security in accordance with an illustrative embodiment.

Turning next to FIG. 16, a more detailed flowchart of a process for analyzing financial risk of a financial security is depicted in accordance with an illustrative embodiment. The process illustrated in FIG. 16 is an example of one manner in which step 1460 in FIG. 14 can be implemented.

Continuing from step 1450 of FIG. 14, the process generates a projection of the financial risk based on the financial model and the assumption that was updated (step 1610). The process displays a visualization of the projection on the mobile display system (step 1620). The process terminates thereafter.

Figure 17:
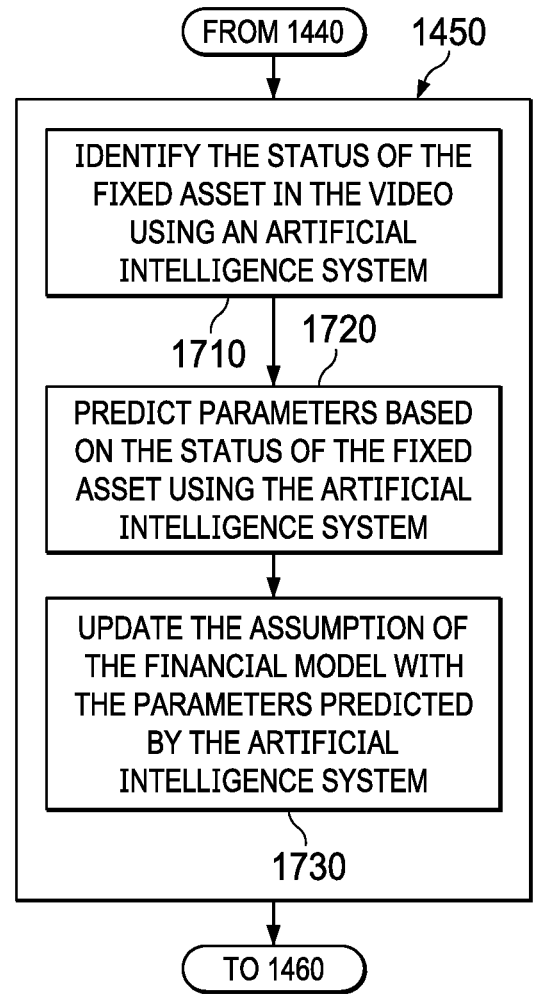
FIG. 17 is a flowchart of a process for updating the assumption of the financial model in accordance with an illustrative embodiment.

With reference next to FIG. 17, a flowchart of a process for updating an assumption of a financial model is depicted in accordance with an illustrative embodiment. The process illustrated in FIG. 17 is an example of one manner in which step 1450 in FIG. 14 can be implemented. The process in FIG. 17 can also be used to provide reinforcement training to machine learning models.

Continuing from step 1440 of FIG. 14, the process uses an artificial intelligence system to identify the status of the fixed asset in the video (step 1710). The process uses the artificial intelligence system to predicting parameters based on the status of the fixed asset (step 1720). The process updates the assumption of the financial model with the parameters predicted by the artificial intelligence system (step 1730). Thereafter, the process can continue to step 1460 of FIG. 14.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 18:
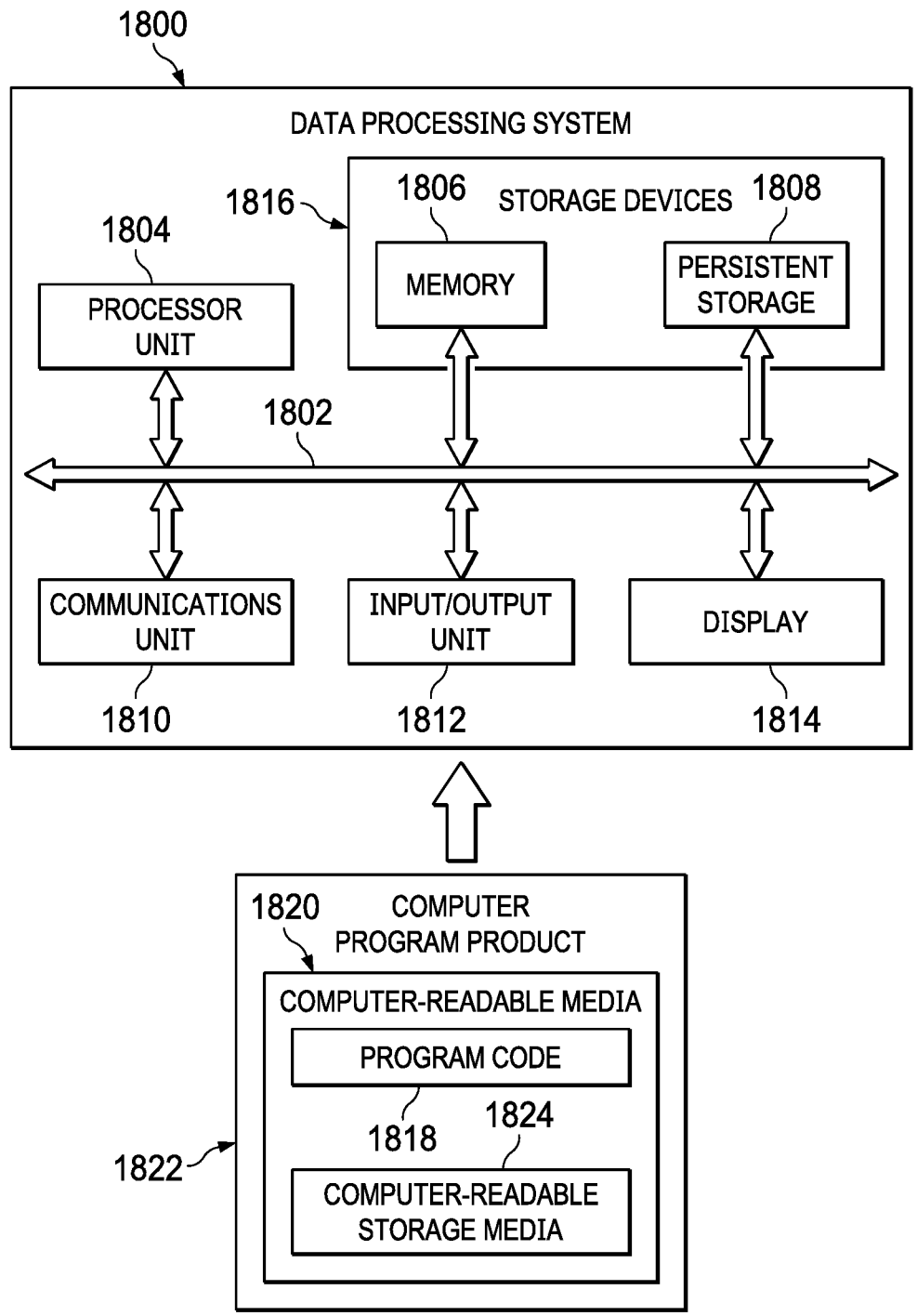
FIG. 18 is a block diagram of a data processing system in accordance with an illustrative embodiment.

Turning now to FIG. 18, a block diagram of a data processing system is depicted in accordance with an illustrative embodiment. Data processing system 1800 can be used to implement server computer 104, server computer 106, and client devices 110 in FIG. 1. Data processing system 1800 can also be used to implement computer system 204 in FIG. 2. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program code, computer usable program code, or computer-readable program code that can be read and executed by a processor in processor unit 1804. The program code in the different embodiments can be embodied on different physical or computer-readable storage media, such as memory 1806 or persistent storage 1808.

Program code 1818 is located in a functional form on computer-readable media 1820 that is selectively removable and can be loaded onto or transferred to data processing system 1800 for execution by processor unit 1804. Program code 1818 and computer-readable media 1820 form computer program product 1822 in these illustrative examples. In the illustrative example, computer-readable media 1820 is computer-readable storage media 1824.

In these illustrative examples, computer-readable storage media 1824 is a physical or tangible storage device used to store program code 1818 rather than a medium that propagates or transmits program code 1818.

Alternatively, program code 1818 can be transferred to data processing system 1800 using a computer-readable signal media. The computer-readable signal media can be, for example, a propagated data signal containing program code 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program code 1818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for analyzing financial risk of a financial security supported by a fixed asset, the method comprising:
    displaying a video on a mobile display system, wherein the mobile display system presents the video using stereoscopic display to provide a virtual reality experience to a user;
    performing object detection on the video to identify the fixed asset in the video;
    identifying the financial security supported by the fixed asset identified in the video;
    displaying a first overlay of financial data about the financial security in association with the fixed asset in the video;
    displaying a second overlay that identifies a financial model that was used to determine the financial data about the financial security, and wherein the second overlay further identifies an assumption of the financial model, wherein the assumption is an estimate of an uncertain variable input to the financial model;
    updating the assumption of the financial model based on a status of the fixed asset identified in the video, wherein the status of the fixed asset is a physical condition of the fixed asset that impacts the financial risk associated with the financial security supported by the fixed asset;
    analyzing financial risk of the financial security based on the financial model and the assumption that was updated, wherein updating the assumption of the financial model further comprises:
        using an artificial intelligence system to identify the status of the fixed asset in the video;
        using the artificial intelligence system to predict parameters for the financial model based on the status of the fixed asset identified using the artificial intelligence system; and
        training the financial model by updating the assumption of the financial model with the parameters predicted for the financial model by the artificial intelligence system; and
    receiving a voice command over a voice user interface;
    extracting the parameters from the voice command; and
    updating the artificial intelligence system based on the parameters extracted from the voice command.

2. The computer-implemented method of claim 1, wherein updating the assumption of the financial model further comprises:
    receiving a voice command over a voice user interface;
    extracting parameters from the voice command; and
    updating the assumption of the financial model with the parameters extracted from the voice command.

3. The computer-implemented method of claim 2, wherein analyzing the financial risk of the financial security further comprises:
    generating a projection of the financial risk based on the financial model and the assumption that was updated; and
    displaying a visualization of the projection on the mobile display system.

4. The computer-implemented method of claim 1, further comprising:
    displaying a set of media objects in a graphical user interface of the mobile display system, wherein each media object has a texture corresponding to its media content; and
    responsive to a selection of a media object, updating a background texture of the graphical user interface to display the media content of the media object that was selected.

5. The computer-implemented method of claim 4, wherein the set of media objects comprises:
    a control object associated with a virtual tour of a set of fixed assets supporting the financial security.

6. The computer-implemented method of claim 5, wherein displaying the video further comprises:
    selecting a video object that corresponds to the video; and
    responsive to selecting the video object that corresponds to the video, displaying the video as the background texture of the graphical user interface.

7. A risk visualization system comprising:
    a computer system that:
        displays a video on a mobile display system, wherein the mobile display system presents the video using stereoscopic display to provide a virtual reality experience to a user;
        performs object detection on the video to identify a fixed asset in the video;
        identifies a financial security supported by the fixed asset identified in the video;
        displays a first overlay of financial data about the financial security in association with the fixed asset in the video;
        displays a second overlay that identifies a financial model that was used to determine the financial data about the financial security, and wherein the second overlay further identifies an assumption of the financial model;
        updates the assumption of the financial model based on a status of the fixed asset in the video;
        analyzes financial risk of the financial security based on the financial model and the assumption that was updated, wherein in updating the assumption of the financial model, the computer system further:
            uses an artificial intelligence system to identify the status of the fixed asset in the video;
            uses the artificial intelligence system to predict parameters based on the status of the fixed asset; and updates the assumption of the financial model with the parameters predicted by the artificial intelligence system; and
receiving a voice command over a voice user interface; extracting the parameters from the voice command; and updating the artificial intelligence system based on the parameters extracted from the voice command.

8. The risk visualization system of claim 7, wherein in updating the assumption of the financial model, the computer system further:
receives a voice command over a voice user interface;
extracts parameters from the voice command; and
updates the assumption of the financial model with the parameters extracted from the voice command.

9. The risk visualization system of claim 8, wherein in analyzing the financial risk of the financial security, the computer system further:
generates a projection of the financial risk based on the financial model and the assumption that was updated; and
displays a visualization of the projection on the mobile display system.

10. The risk visualization system of claim 7, wherein the computer system further:
receives a voice command over a voice user interface;
extracts the parameters from the voice command; and
updates the artificial intelligence system based on the parameters extracted from the voice command.

11. The risk visualization system of claim 7, wherein the computer system further:
displays a set of media objects in a graphical user interface of the mobile display system, wherein each media object has a texture corresponding to its media content; and
responsive to a selection of a media object, updates a background texture of the graphical user interface to display the media content of the media object that was selected.

12. The risk visualization system of claim 11, wherein the set of media objects comprises:
a control object associated with a virtual tour of a set of fixed assets supporting the financial security.

13. The risk visualization system of claim 12, wherein in displaying the video, the computer system further:
selects a video object that corresponds to the video; and
responsive to selecting the video object that corresponds to the video, displays the video as the background texture of the graphical user interface.

14. A computer program product for analyzing financial risk of a financial security supported by a fixed asset, the computer program product comprising:
a computer-readable storage media;
program code, stored on the computer-readable storage media, for displaying a video on a mobile display system, wherein the mobile display system presents the video using stereoscopic display to provide a virtual reality experience to a user;
program code, stored on the computer-readable storage media, for performing object detection on the video to identify the fixed asset in the video;
program code, stored on the computer-readable storage media, for identifying the financial security supported by the fixed asset identified in the video;
program code, stored on the computer-readable storage media, for displaying a first overlay of financial data about the financial security in association with the fixed asset in the video;
program code, stored on the computer-readable storage media, for displaying a second overlay that identifies a financial model that was used to determine the financial data about the financial security, and wherein the second overlay further identifies an assumption of the financial model, wherein the assumption is an estimate of an uncertain variable input to the financial model;
program code, stored on the computer-readable storage media, for updating the assumption of the financial model based on a status of the fixed asset identified in the video, wherein the status of the fixed asset is a physical condition of the fixed asset that impacts the financial risk associated with the financial security supported by the fixed asset;
program code, stored on the computer-readable storage media, for analyzing the financial risk of the financial security based on the financial model and the assumption that was updated, wherein the program code for updating the assumption of the financial model further comprises:
program code, stored on the computer-readable storage media, for using an artificial intelligence system to identify the status of the fixed asset in the video;
program code, stored on the computer-readable storage media, for using the artificial intelligence system to predict parameters for the financial model based on the status of the fixed asset identified using the artificial intelligence system; and
program code, stored on the computer-readable storage media, for training the financial model by updating the assumption of the financial model with the parameters predicted for the financial model by the artificial intelligence system; and
program code, stored on the computer-readable storage media, for receiving a voice command over a voice user interface;
program code, stored on the computer-readable storage media, for extracting the parameters from the voice command; and
program code, stored on the computer-readable storage media, for updating the artificial intelligence system based on the parameters extracted from the voice command.

15. The computer program product of claim 14, wherein the program code for updating the assumption of the financial model further comprises:
program code, stored on the computer-readable storage media, for receiving a voice command over a voice user interface;
program code, stored on the computer-readable storage media, for extracting parameters from the voice command; and
program code, stored on the computer-readable storage media, for updating the assumption of the financial model with the parameters extracted from the voice command.

16. The computer program product of claim 15, wherein the program code for analyzing the financial risk of the financial security further comprises:
program code, stored on the computer-readable storage media, for generating a projection of the financial risk based on the financial model and the assumption that was updated; and
program code, stored on the computer-readable storage media, for displaying a visualization of the projection on the mobile display system.

17. The computer program product of claim 14, further comprises:
  program code, stored on the computer-readable storage media, for receiving a voice command over a voice user interface;
  program code, stored on the computer-readable storage media, for extracting the parameters from the voice command; and
  program code, stored on the computer-readable storage media, for updating the artificial intelligence system based on the parameters extracted from the voice command.

18. The computer program product of claim 14, further comprising:
  program code, stored on the computer-readable storage media, for displaying a set of media objects in a graphical user interface of the mobile display system, wherein each media object has a texture corresponding to its media content; and
  program code, stored on the computer-readable storage media, for updating a background texture of the graphical user interface to display the media content of the media object that was selected in response to a selection of a media object.

19. The computer program product of claim 18, wherein the set of media objects comprises:
  a control object associated with a virtual tour of a set of fixed assets supporting the financial security.

20. The computer program product of claim 19, wherein the program code for displaying the video further comprises:
  program code, stored on the computer-readable storage media, for selecting a video object that corresponds to the video; and
  program code, stored on the computer-readable storage media, for displaying the video as the background texture of the graphical user interface in response to selecting the video object that corresponds to the video.

21. The computer-implemented method of claim 1, wherein the financial security is a negotiable financial instrument that represents a type of monetary value.

22. The risk visualization system of claim 7, wherein the financial security is a negotiable financial instrument that represents a type of monetary value.

23. The computer program product of claim 14, wherein the financial security is a negotiable financial instrument that represents a type of monetary value.

\* \* \* \* \*